United States Patent [19]

Kreitzman

[11] Patent Number: 5,391,084
[45] Date of Patent: Feb. 21, 1995

[54] GROUNDING ASSEMBLY FOR ELECTRICAL DISTRIBUTION PANELS

[75] Inventor: William D. Kreitzman, Elk, Wash.

[73] Assignee: Chatsworth Products, Inc., Chatsworth, Calif.

[21] Appl. No.: 190,381

[22] Filed: Mar. 11, 1994

[51] Int. Cl.⁶ ............................................ H01R 13/648
[52] U.S. Cl. ................................... 439/98; 439/100; 24/339
[58] Field of Search ............... 439/98, 100, 786, 787, 439/796; 24/339, 707.4

[56] References Cited

U.S. PATENT DOCUMENTS

| 2,972,494 | 2/1961 | Dominic | 24/339 |
| 3,066,902 | 12/1962 | Conil | 24/339 |
| 5,035,384 | 7/1991 | Werthmann | 24/339 |

FOREIGN PATENT DOCUMENTS 981072  1/1965  United Kingdom ................ 24/339

Primary Examiner—Gary F. Paumen
Attorney, Agent, or Firm—Shefte, Pinckney & Sawyer

[57] ABSTRACT

A grounding assembly for use with an electrical distribution panel for grounding electrical cables which includes a support bar that extends generally longitudinally with respect to the panel and which is connected to a grounding block mounted on the panel. A plurality of grounding clips are mounted on the support bar, each of which includes mounting flanges formed with an opening for receiving the support bar, and each of which includes a plurality of flexible arms carried on the mounting flange, with each arm being movable to receive one of the electrical cables and to clamp such cable in place against the support bar.

5 Claims, 3 Drawing Sheets

GROUNDING ASSEMBLY FOR ELECTRICAL DISTRIBUTION PANELS

BACKGROUND OF THE INVENTION

Many wire distribution systems include patch panels which must have some arrangement for properly grounding the many electrical cables that are fed to the panel.

One common grounding system typically found in electrical distribution panels consists of a steel tray to which a grounding block is mounted, and the cables fed to the distribution panel are grounded at this grounding block. A grounding tower assembly is mounted at the back of the steel tray and it consists of a plurality (e.g., four) brackets that are spot welded to a base plate, with each bracket being provided with openings through which conventional grounding clips are mounted on the brackets. All of the components must be zinc plated or otherwise processed to allow electrical conductivity.

While these systems are entirely functional, they are relatively expensive to produce because of the large number of sheet metal parts which must be punched, stamped, and zinc plated, and then the metal parts must be spot welded in place. Additionally, in conventional panel designs, a separate grounding clip must be provided for each electrical cable to be grounded, which may require up to sixty-four separate grounding clips, depending on the panel size.

Finally, in conventional distribution panels of the aforesaid type, the grounding system inherently occupies a significant amount of space, which results in increased size and greater production expenses, and which results in the overall distribution system occupying a larger footprint.

SUMMARY OF THE INVENTION

In accordance with the present invention, a grounding assembly is provided for use with an electrical distribution panel for grounding electrical cables associated with the panel, and the grounding assembly includes a support member, preferably a round support bar, formed of electrically conductive material and extending longitudinally with respect to the panel and connectable at one of its end with a grounding block mounted on the panel. At least one grounding clip is mounted on the support member, and such clip includes at least one mounting flange formed with an opening for receiving the support member and permitting movement of the grounding clip longitudinally along the support member, and it also includes a plurality of flexible arms carried on the mounting flange with each arm being movable between a first position at which it provides a spacing between the arm and the support member large enough to receive one of the electrical cables to be grounded and a second position at which one of the electrical cables is clamped in place against the support member by the flexible arm.

In the preferred embodiment of the present invention, the grounding clip includes two flexible arms, each of which extends in opposite directions from the mounting flange and in a direction generally parallel to the longitudinal extent of the support member, whereby the grounding clip can clamp four different electrical cables in place on the support member. Also, each extending end of each flexible arm is formed with a predetermined surface configuration, preferably a U-shaped configuration having the convex surface thereof directed toward the support member, so as to provide a first camming portion formed to cause its associated arm to move to the aforesaid first position thereof when a cable is pushed inwardly between such arm and the support member, and a second clamping portion formed to hold the cable in place against the support member when the flexible arm moves to its aforesaid second position.

Also, the preferred embodiment of the grounding clip includes two mounting flanges, each being formed of resilient material and being movable between a first unbiased position at which the two flanges extend generally transversely with respect to the support member and away from one another at an acute angle to thereby grip the support member and maintain the grounding clip in place on the support member. The two flanges can also be moved to a second position, at which they extend in a direction generally parallel to one another and generally perpendicular to the support member, whereby the grounding clip is freely movable along the longitudinal extent of the support member for positioning the grounding clip thereon.

Finally, one feature of the present invention is that the grounding clip can be stamped from a single piece of electrically conductive metal, and then formed with a stanchion panel having the two aforesaid flexible arm portions bent outwardly at the upper and lower edges of the stanchion and having the two aforesaid mounting flanges bent in the same direction at the side edges of the stanchion.

DESCRIPTION OF THE PREFERRED EMBODIMENT

Figure 1:
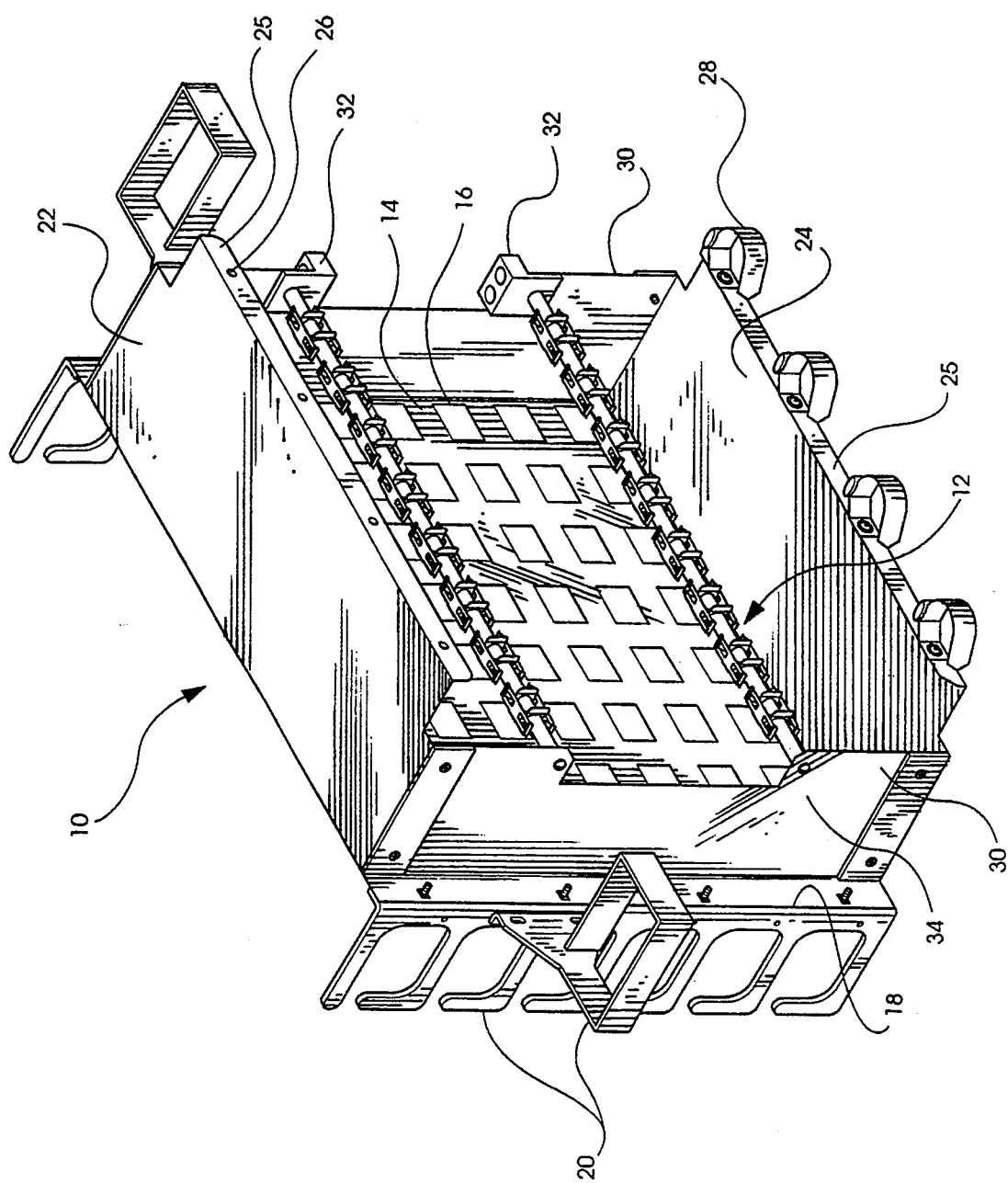
FIG. 1 is a perspective view of a generally conventional electrical distribution panel system, and illustrating the unique grounding assembly of the present invention associated with such panel.

Looking now in greater detail at the accompanying drawings, FIG. 1 is a rear view of a typical sixty-four port data distribution patch panel assembly 10, which includes two grounding assemblies 12 which embody the present invention. The distribution panel includes a front wall 14 having a plurality, in this case sixty-four, of cut-outs or openings 16 through which the electrical cable connectors (not shown) would normally plug into. Side flanges 18 are provided to permit the panel assembly to be mounted on an equipment rack (not shown) and a plurality of cable rings 20 are mounted to the side flanges 18. The panel 10 also includes a top plate 22 and a bottom plate 24 which are bent back from the front wall 14, and both of these plates include a vertical flange 25 having holes 26 therein to permit cable securing straps 28 to be secured in the flanges of the top panel 22 or the bottom panel 24, depending on whether the cables are coming down from the ceiling or up from the floor. The panel 10 also includes a pair of identical side plates 30 that extend perpendicularly with respect to the front wall 14, and which extend between the top panel 22 and bottom panel 24. One of the side plates 30 has mounted thereon two grounding blocks 32, each of which receives one end of a grounding assembly 12, with the other end of the grounding assembly 12 being secured through the opposite side panel 30 using a screw 34 that extends through the side panel 30 to a connection with a threaded hole 36 (see FIG. 2) in the end of the grounding assembly 12.

Figure 2:
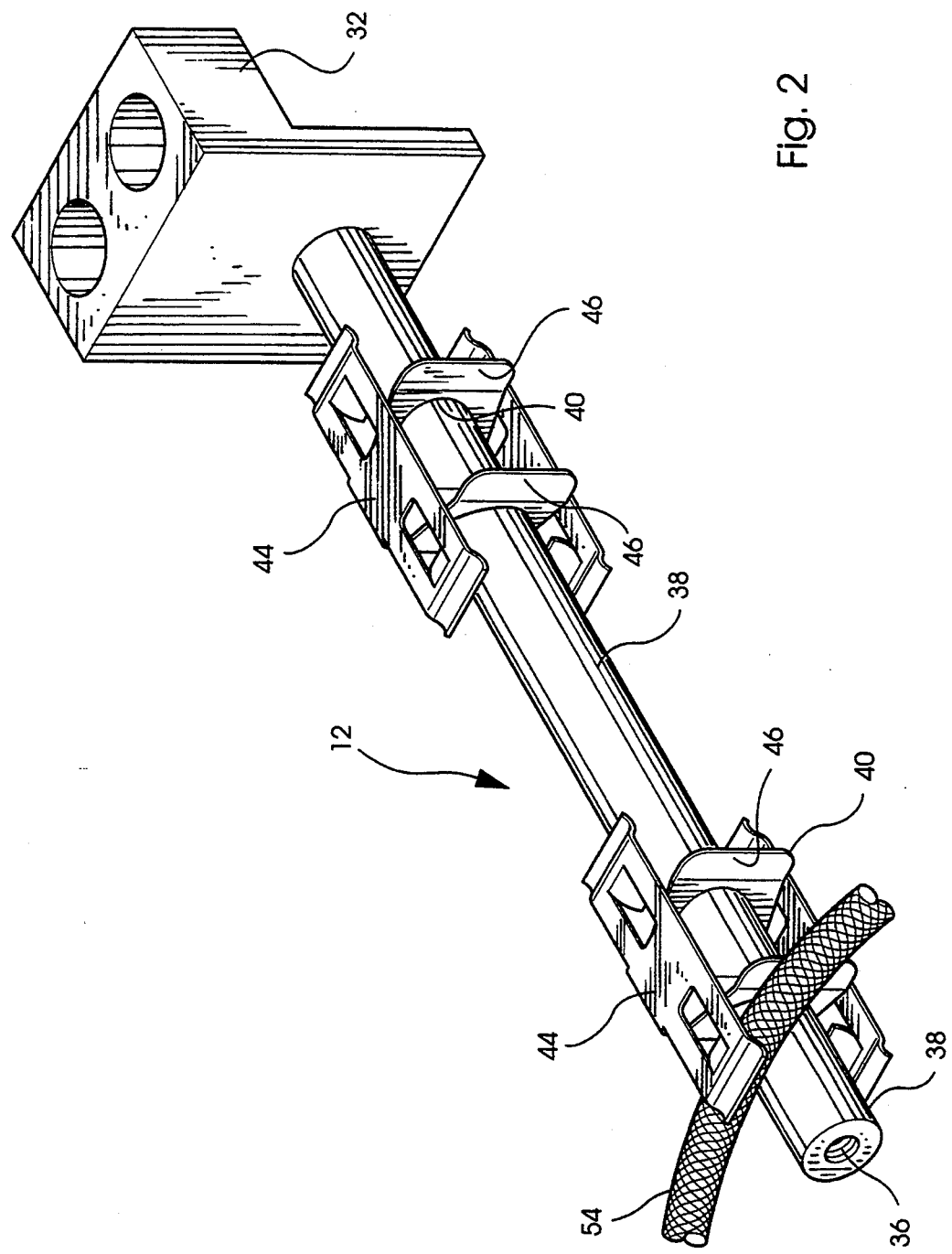
FIG. 2 is a detailed view illustrating the grounding assembly of the present invention.
Figure 3:
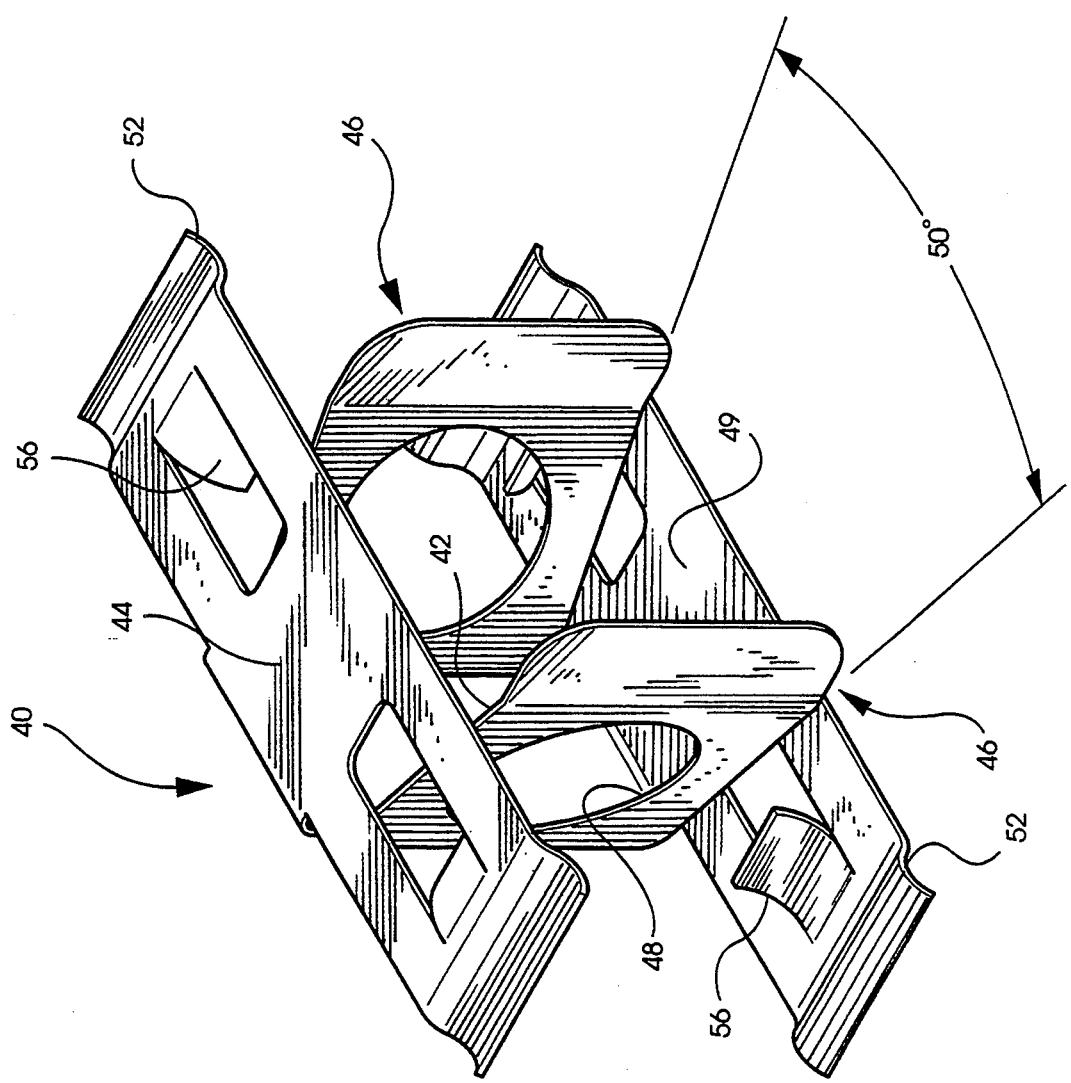
FIG. 3 is a detailed perspective view of one of the grounding clips forming part of the grounding assembly of the present invention.

As best seen in FIGS. 2 and 3, each grounding assembly 12 includes a round rod or shaft 38 that extends longitudinally between the side panels 30 and parallel to the front wall 14 of the panel 10, and a plurality of grounding clips 40 are disposed on the rod 28. Each grounding clip 40 is preferably stamped from a single sheet of conductive metal, and includes a stanchion panel 42 that extends vertically and generally tangential with respect to the support shaft 38, and first and second arm portions 44 that are bent away from the top and bottom edges of the stanchion panel 42 at a angle of approximately 90° with respect thereto, whereby each of the arm portions 44 extends generally parallel to the support bar 38 as best seen in FIG. 2. The grounding clips 40 also include first and second mounting flanges 46 which are also bent inwardly from away from the side edges of the stanchion panel 42, and each of which is formed with a round opening 48 having a diameter that is slightly greater than the diameter of the support bar 38.

As best seen in FIG. 3, the mounting flanges 46 are bent inwardly from the stanchion panel 42 so as to assume a natural position at which they extend generally transversely with respect to the support bar 38 and away from one another at an acute angle, which is indicated by the reference numeral 50. By virtue of this diverging relationship of the mounting flanges 46 and the somewhat larger openings 48 therein, the mounting flanges 46 create a wedging action with respect to the support bar 38 to thereby grasp the support bar 38 and maintain the grounding clip 40 in place on the support bar 38. However, because the grounding clip 40 is made from a flexible and resilient metal, the mounting flanges 48 can be squeezed together by engaging the outwardly extending ends of the mounting flanges 46 and moving them toward one another to a second release position at which they are flexed relative to the stanchion panel 42 to extend in a direction generally parallel to one another and generally perpendicular to the support bar 38, whereby the now aligned and somewhat larger openings 48 permit the grounding clip 40 to be moved longitudinally along the support 38 until the grounding clip 40 is properly placed thereon, after which the mounting flanges 46 are released and returned to their initial position to maintain the grounding clip 40 in place on the support bar 38.

Each of the four extending ends of the two arm portions 44 are formed with a generally U-shaped configuration 52, with the convex surface thereof facing the support bar 38 in spaced relation thereto. Again, because of the generally flexible or resilient metal from which the grounding clip 40 is made, the U-shaped ends 52 of the arm portions 44 permit an electrical cable 54 (see FIG. 2) which is to be grounded by the grounding assembly 12 to be pushed inwardly between the support bar 38 and the extending ends of each of the arm portions 44, whereby the outermost portion of the U-shaped end 52 will cause the end of the arm portion 44 to flex upwardly under the camming action created by the U-shaped end 52 until the cable 54 passes the midpoint of the U-shaped end 52, and the arm portion 44 then flexes inwardly towards the support bar 38 to clamp the cable in place against the support rod 38 in grounding relationship therewith as illustrated in FIG. 2. In the preferred embodiment of the present invention, each of the extending ends of the arm portions 44 may also be provided with an inwardly bent tab 56 which is disposed to cooperate with the U-shaped end portions 52 for properly holding the cable 54 in place.

While the grounding assemblies 12 have been described above in conjunction with a sixty-four port distribution panel, it is to be understood that the grounding assemblies of the present invention have application in a wide variety of other panels such as, for example, conventional sixteen port and eight port panels where only one grounding assembly 12 of the type described above would be required by virtue of the fact that each grounding assembly is capable of grounding thirty-two separate cables.

The grounding assembly of the present invention offers significant advantages over the conventional distribution panels of the type described above. More specifically, the cost of producing the grounding assembly of the present invention is significantly less than the cost of producing conventional grounding systems. For example, in a typical sixty-four port distribution panel, the grounding system consists of six sheet metal parts which must be punched, then formed, zinc plated, and spot welded, each of which is a somewhat expensive operation. By contrast, in the grounding assembly of the present invention, all of these parts are replaced by two support rods 38 and sixteen inexpensive grounding clips 40. In the latter regard, it is significant to note that in conventional panels, one grounding clip is required for each cable (e.g., sixty-four separate clips in a sixty-four port panel), whereas each of the grounding clips 40 in the present invention can be used to ground four cables 54, thereby reducing the number of required clips to one-fourth of the number found in existing systems.

Also, conventional grounding systems occupy a significant amount of space behind the front wall 14, which increases the overall size of the distribution panel and increases the space requirements for receiving the panel in view of the enlarged footprint of the panel. However, with the present invention, and as illustrated in FIG. 1, the support bars 38 can be mounted much closer to the front wall 14, thereby reducing substantially the overall size of the distribution panel. This closer spacing of the support bar 38, and the grounding clips 40 attached thereto, also provides an additional benefit in that a shorter length of insulation can be stripped from the cable 54 because the grounding clips 40 are located closer to the cable connectors.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A grounding assembly for use with an electrical distribution panel for grounding electrical cables associated with such panel, said grounding assembly including:
   (a) a support member formed of electrically conductive material, and extending longitudinally with respect to said panel and connectable with a grounding block mounted on said panel; and
   (b) at least one grounding clip mounted on said support member, said grounding clip including at least one mounting flange formed with an opening for receiving said support member and permitting movement of said grounding clip along said longitudinal extent of said support member, and a plurality of flexible arms carried by said mounting flange with each said arm being movable between a first position to provide a spacing between said arm and said support member large enough to receive a respective one of said cables, and a second position at which said respective one of said cables is clamped in place against said support member by said arm.

2. A grounding assembly as defined in claim 1 wherein said grounding clip includes two of said flexible arms, each of which extends in opposite direction from said mounting flange and in a direction generally parallel to said longitudinal extent of said support member, whereby said grounding clip can clamp four different electrical cables in place on said support member.

3. A grounding assembly as defined in claim 2 whereby each said arm includes a predetermined surface configuration at each extending end thereof, said predetermined surface configuration including a first camming portion formed to cause said arm to move to said first position thereof when a cable is pushed inwardly between said arm and said support member and a second clamping portion formed to hold said cable in place against said support member when said arm moves to said second position thereof.

4. A grounding assembly as defined by claim 1 wherein two said mounting flanges are provided, each being formed of resilient material and being movable between a first unbiased position at which said two flanges extend generally transversely with respect to said support member and away from one another at an acute angle to thereby grasp said support member and maintain said grounding clip in place on said support member, and a second position at which said two flanges extend in a direction generally parallel to one another and generally perpendicular to said support member whereby said grounding clip is freely movable along said longitudinal extent of said support member for positioning said grounding clip thereon.

5. A grounding assembly for use with an electrical distribution panel for grounding electrical cables associated with said panel, said grounding assembly including:
   (a) a generally round support bar formed of electrically conductive material and extending longitudinally with respect to said panel and connectable at one of its ends to a grounding block mounted on said panel;
   (b) a plurality of grounding clips mounted on said support bar, each said grounding clip being stamped from a sheet of metal and comprising:
      (i) a stanchion panel extending generally tangentially with respect to said support bar;
      (ii) first and second arm portions formed integrally with said stanchion panel at opposite ends, respectively, of said stanchion panel, each said arm portion being bent inwardly from said stanchion panel to extend generally parallel to said support bar and generally perpendicular to said stanchion panel, and each extending end of each arm portion having a generally U-shaped configuration with the convex surface thereof facing said support bar and spaced therefrom so as to cause said arm portion to flex outwardly away from said support bar when one of said electrical cables is pushed inwardly between said arm portion and said support bar and then flex inwardly toward said support bar to clamp said electrical cable in place against said support bar; and
      (iii) first and second mounting flanges being formed integrally with said stanchion panel at the side edges thereof, respectively, each said mounting flange being formed with an opening larger than said support bar, and said mounting flanges being bent inwardly from said stanchion panel to assume a natural position at which they extend generally transversely with respect to said support bar and away from one another at an acute angle to thereby grasp said support member and maintain said grounding clip in place on said support bar, and being movable to a release position at which they are flexed relative to said stanchion panel to extend in a direction generally parallel to one another and generally perpendicular to said support bar whereby said larger openings in said mounting flanges permit said grounding clip to be freely movable along said support bar for positioning said grounding clip thereon.

* * * * *